INVENTOR.
HARRY W. MOORE
BY
HIS ATTORNEYS

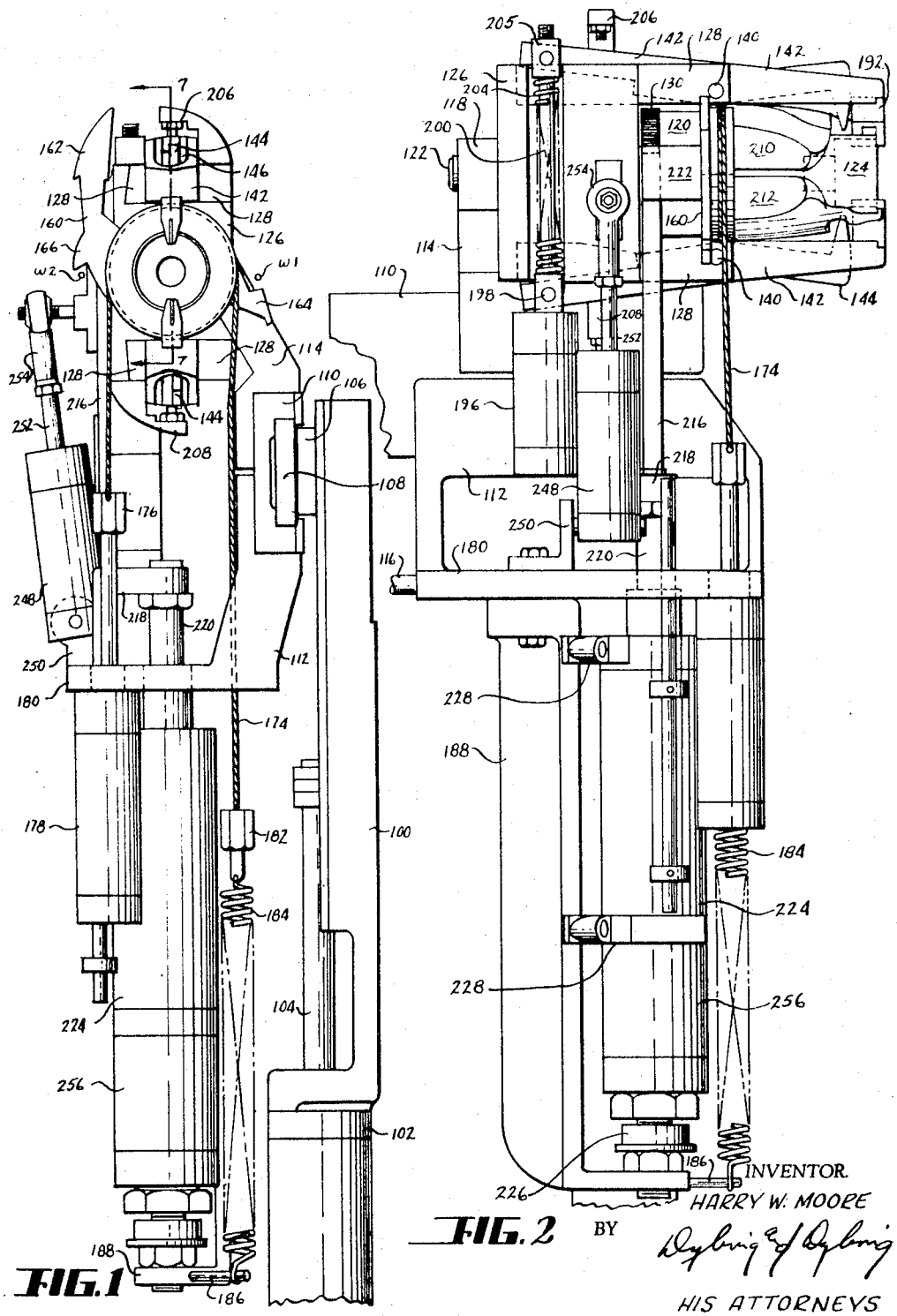

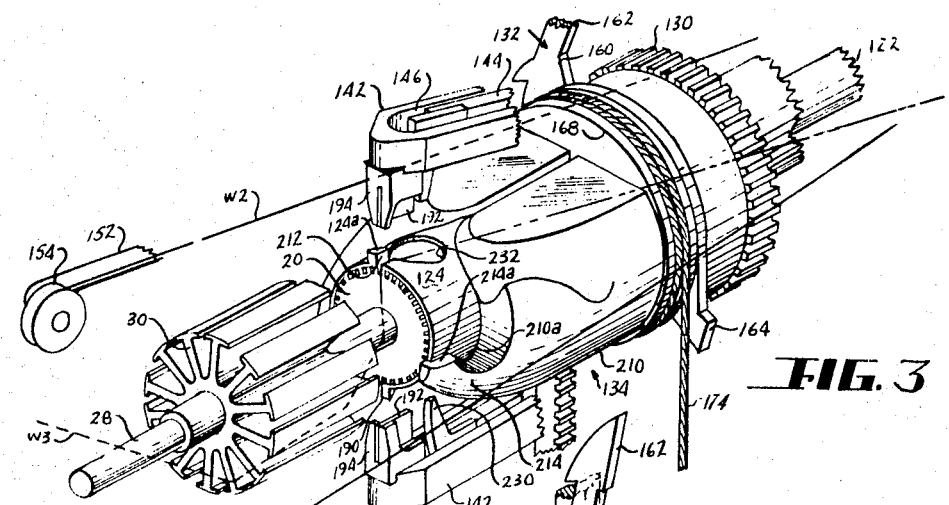
FIG. 3
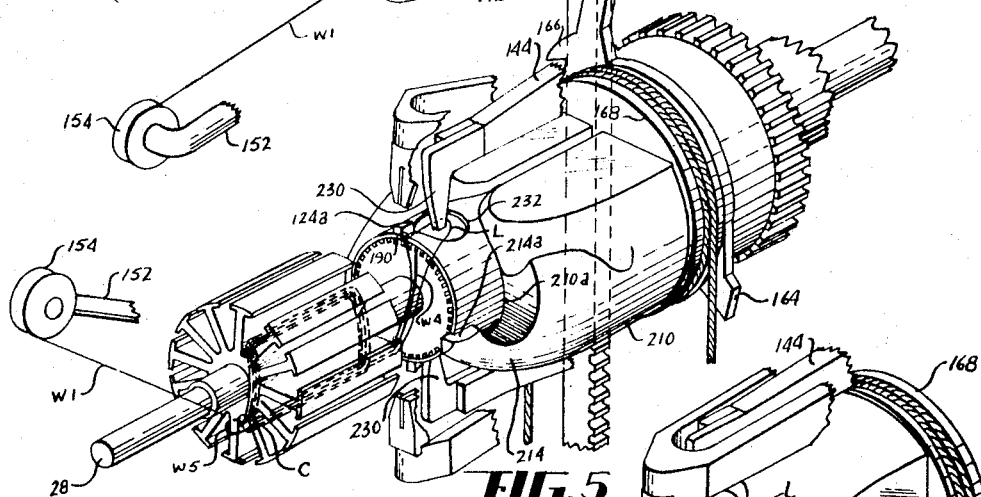
FIG. 5
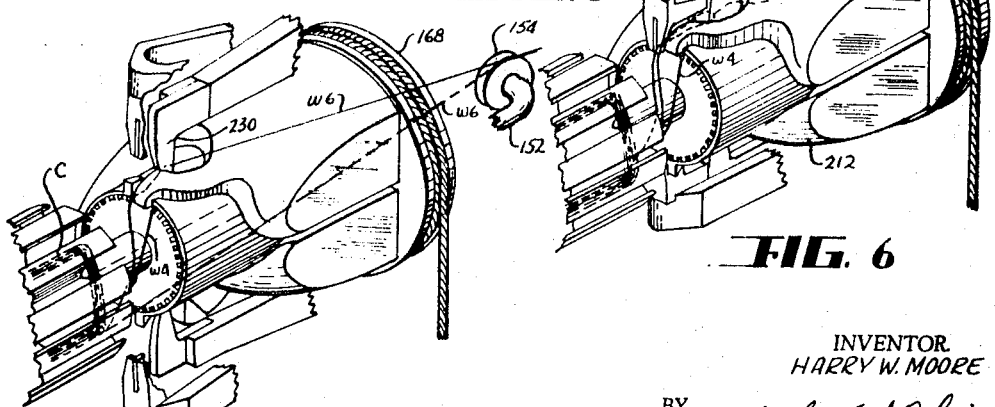
FIG. 4
FIG. 6
INVENTOR.
HARRY W. MOORE
BY
HIS ATTORNEYS July 15, 1969   H. W. MOORE   3,455,009
ARMATURE WINDING MACHINE
Original Filed April 4, 1963   3 Sheets-Sheet 3

United States Patent Office 3,455,009
Patented July 15, 1969

3,455,009
ARMATURE WINDING MACHINE
Harry W. Moore, Dayton, Ohio, assignor to The Globe Tool and Engineering Company, Dayton, Ohio, a corporation of Ohio
Original application Apr. 4, 1963, Ser. No. 270,741, now Patent No. 3,395,449, dated Aug. 6, 1968. Divided and this application Aug. 9, 1967, Ser. No. 679,946
Int. Cl. B65h 81/02
U.S. Cl. 29—205          8 Claims

ABSTRACT OF THE DISCLOSURE

Armature coil lead wires directed between the coil and a flier are deflected to a new position along a shield covering commutator bar slots and deposited in an exposed commutator bar slot. A tamping mechanism temporarily wedges a portion of the lead wire in the slot. The lead wire is looped about a movable hook and a second portion thereof wedged into the same commutator bar slot. Alternatively, a lead wire loop is deposited in an adjacent pair of slots in a single commutator bar with the loop hooked around the commutator bar material between the adjacent slots.

---

This is a division of application Ser. No. 270,741, filed Apr. 4, 1963, now U.S. Patent No. 3,395,449, granted Aug. 6, 1968.

This invention relates to an armature winding machine and more particularly to apparatus for attaching armature coil lead wires to commutator bars which are mounted on an armature shaft. However, the invention is not necessarily so limited.

An object of this invention is to provide improved apparatus for attaching coil lead wire to commutator bars.

More specifically, it is an object of this invention to provide apparatus for temporarily attaching coil lead wires to commutator bars the lead wires being permanently attached to the commutator bars by any well-known process, such as soldering or hot staking, at a later time.

Other objects and advantages reside in the construction of parts, the combination thereof, the method of manufacture and the mode of operation, as will become more apparent from the following description.

Referring to the drawings, FIGURE 1 is a front elevational view of apparatus made in accordance with this invention used for attaching coil lead wires to commutators. Portions of the apparatus have been deleted to more clearly illustrate the portions thereof.

FIGURE 2 is a side elevational view of the mechanism of FIGURE 1.

FIGURE 3 is an enlarged perspective view of a portion of the mechanism shown in FIGURES 1 and 2.

FIGURES 4, 5 and 6 are each perspective views similar to FIGURE 3, with portions cut away, and showing various stages in the operation of the mechanism of FIGURE 3.

Figure 8:
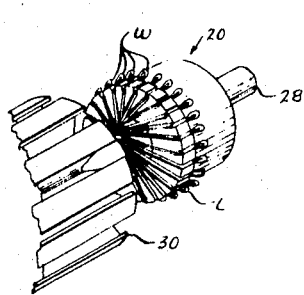
FIGURE 8 is a partial perspective view of an armature core and a commutator and illustrating one step in the method according to this invention.
Figure 9:
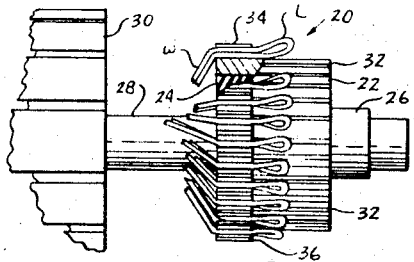
FIGURE 9 is a partial side elevational view, with parts in cross-section, of the assembly shown in FIGURE 8.
Figure 10:
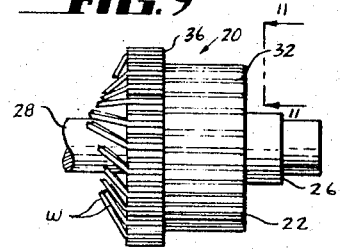
FIGURE 10 is a side elevational view of the commutator and a portion of the armature shaft illustrating a later step in the method according to this invention.

Referring to FIGURES 8, 9, 10 and 11, a commutator 20 is illustrated therein, which may be of the type having a plurality of circumferentially spaced commutator bars 22 molded on the outer surface of a suitable insulating core 24, which in turn is mounted on a sleeve 26 affixed to an armature shaft 28. Also affixed to the armature shaft 28 is the usual slotted armature core, designated 30. Each of the commutator bars 22 are separated by suitable insulating plates such as those indicated at 32. The precise structure of the core 24 is unimportant to this invention and may be made in any conventional manner, since this invention is concerned primarily with the method and apparatus for attaching lead wires, designated W, in FIGURES 8 through 11, to slots 34 in the commutator bars 22. The bars 22 in FIGURES 8 through 10 are enlarged at the ends thereof adjacent the armature core 30 to provide risers designated 36, which are slotted to receive the lead wires W. Of course, the lead wires W project outwardly of selected slots in the armature core from coils which are wound therein. No specific mechanism is illustrated herein for winding the coils, since such mechanism may be made in any suitable manner. One suitable winding machine is shown in Moore Patent No. 2,627,379.

Figure 11:
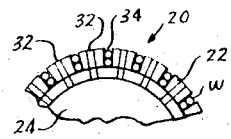
FIGURE 11 is a partial end elevational view, as viewed in the direction of arrows 11—11 of FIGURE 10.

Briefly, the method of attaching the lead wires W to the commutator bars 22 shown in FIGURES 8 through 11 is as follows. After a coil has been wound in a pair of circumferentially spaced slots in the armature core 30, the wire leading therefrom to the winding device is deflected in a circumferential direction to a preselected slot 34 in one of the commutator bars 22. The portion of the wire within the preselected slot 34 is then tamped such that it is laterally flattened to be temporarily wedged within the slot. Subsequently, the wire is looped back upon itself so that another portion of wire overlies the initial tamped portion. The other portion of wire is also tamped to be wedged within the slot. A loop L is thus formed in each of the wires in the commutator slots, so that there are two thicknesses of wire in each slot. The loops L are severed from the remainder of the wire, as shown in FIGURES 10 and 11, so as not to interfere with the ordinary operation of the commutator after the lead wires are permanently affixed to the commutator bars as by staking or welding. During the winding of a coil on the armature core 30, the commutator slots are shielded, as will be described below, so as not to interfere with the normal winding operation.

Figure 12:
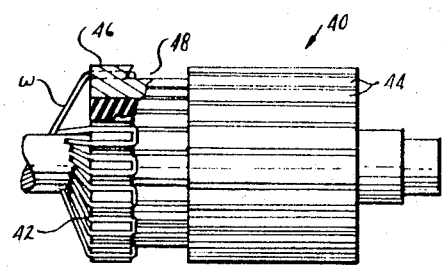
FIGURE 12 is a side elevational view, with parts in cross-section, of a modified commutator to which lead wires are attached following a modified method of this invention.

FIGURE 12 shows a somewhat different commutator construction, designated 40, in which there are two slots, designated 42, in each commutator bar, designated 44. In this case, after a coil is wound, a lead wire W is placed first in one slot 42 and looped back through the other slot 42 so that severing of the loops is unnecessary. Another important difference between the commutator 40 and the commutator 20 illustrated in FIGURES 8 through 11, is in the manner in which the risers, designated 46, are formed on the commutator bars 44. As a practical matter, the risers 36 shown in FIGURES 8 through 11 are formed by cutting or shaving off the outer, cylindrical periphery of the commutator bars 22, except along the ends thereof upon which the risers are formed. Of necessity, the life of the commutator 20 is thereby reduced and the commutator is relatively expensive due to the necessity of shaving the thickness of the commutators bars' surfaces. In the commutator 40 shown in FIGURE 12, only a portion of the cylindrical surface formed by outer surfaces of the bars 44 has been cut away, whereupon an annular channel 48 is formed immediately adjacent the risers 46. The contact surfaces of the commutator bars 4, therefore, are much thicker than would be available with the more conventional commutator structure shown in FIGURES 8 through 11. Note in FIGURE 12 that the rear walls of the risers 46 have been cut to form an inwardly tapered surface providing a hook for firmly retaining the lead wires W. It will thus be apparent that the amount of commutator bar material which must be cut away is materially reduced.

Figure 13:
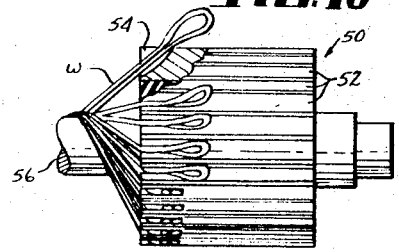
FIGURE 13 is a side elevational view, with parts in cross-section, of still another modified commutator made in accordance with this invention.

FIGURE 13 shows still another commutator, designated 50, employing a plurality of circumferentially spaced commutator bars, designated 52, each of which is provided with a single slot, designated 54. In this case, the slots 54 are cut in the end edges of the commutator bars 52 adjacent the armature core. The armature core, which is not shown in FIGURE 13, is again mounted on the shaft, designated 56, upon which the commutator 50 is mounted. The commutator construction 50 results in a minimal wastage of commutator bar material and considerably reduced expense of production, since only the slots 54 need be cut in the bars 52. None of the contact surfaces of the commutator bars need be shaved or cut. The method of attaching the lead wires W to the commutator bars 52 is the same as that discussed above in relation to FIGURES 8 through 11.

A machine for practicing the method described above with relation to FIGURES 8 through 11 is illustrated in FIGURES 1 through 7. With particular reference to FIGURES 1 and 2, the machine includes a support plate 100, which, if desired, may be raised and lowered by a hydraulic or pneumatic cylinder 102 having a shaft 104 connected to the plate 100. Mounted on the support plate 100 are a pair of slide plates 106 and 108, which receive a slide member 110, upon which a pair of carriages 112 and 114 are mounted for sliding movement. The slide member 110 may be driven along the slide plate 108 by a hydraulic or pneumatic actuator (not shown) having a shaft 116 secured to the carriage 112. The carriage members 112 and 114 are both rigidly connected in any suitable manner to the slide member 110 so that movement of the carriage 112 is accompanied by movement of members 110 and 114.

Figure 7:
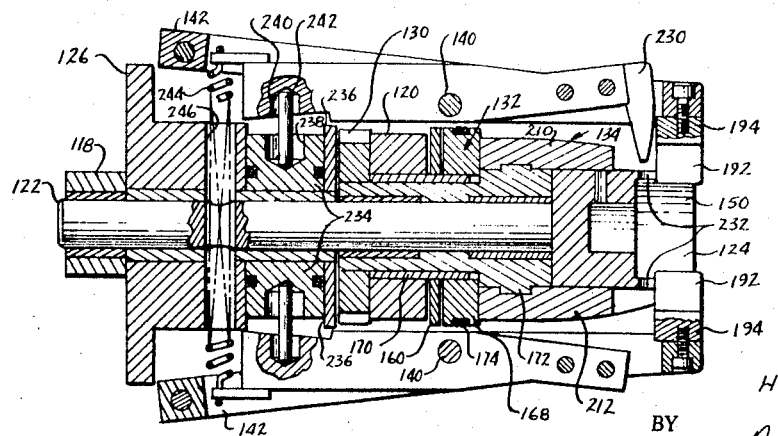
FIGURE 7 is a longitudinal cross-sectional view of a portion of the mechanism of FIGURE 1 taken along line 7—7 thereof.

Referring to FIGURES 2 and 7, supported in any suitable manner by the carriage 114 are a pair of mounting rings 118, 120, which in turn rotatably support a commutator shield support shaft 122. The commutator shield support shaft 122, in addition to supporting a commutator shield 124, which may be integral therewith, supports a generally rectangular actuator housing 126 to which are connected four forwardly projecting tamper and hook support plates 128, there being a pair of opposed upper and lower support plates 128. As will appear more fully below, a spur gear 130, a first lead engaging and deflecting or positioning assembly, generally designated 132, and a second lead engaging and deflecting or positioning member, generally designated 134, are rotatably supported on the shaft 122. Pivotally mounted upon generally parallel upper and lower pins 140 passing through aligned apertures in the opposed pairs of upper and lower support plates 128 are an upper and a lower slotted tamper arm, each designated 142, and an upper and a lower loop-former arm, each designated 144, which partially lie within longitudinal slots, designated 146, within the arms 142 (FIGURE 3). The function and structure of the various elements mounted upon the support shaft 122 will be described in greater detail below.

With reference to FIGURE 3, an armature core 30 and a commutator 20 mounted on a common armature shaft 28 are supported in position for winding with the commutator 20 received within a cup-shaped aperture 150 (FIGURE 7) in the forward end of the commutator shield 124. It is, of course, to be understood that the free end of the armature shaft 28 shown in FIGURE 3 will be supported by other elements and that suitable coil forms will be provided for directing wire into the radially directed slots in the armature core 30, as is well known to those skilled in the art. An example of a suitable coil winding apparatus for use with this invention is described in the Moore Patent No. 2,627,379. As illustrated in FIGURE 3, the armature core 30 may be conventional, having a plurality of circumferentially spaced, radially directed slots and the commutator 20 is of the type shown in FIGURES 8 through 11. The lead wires to be directed from selected slots in the armature core 30 to selected slots in the commutator 20 pass closely adjacent the armature shaft 28 in the manner and for the purposes described in my copending application for United States Letters Patent, Ser. No. 780,150, filed on Dec. 12, 1958.

A pair of flier mechanisms 152 provided with wire guide pulleys 154 are schematically illustrated, each of which is adapted to lay a wire, designated $W_1$ and $W_2$, into a pair of coil receiving slots in the armature core 30. In FIGURE 3, the flier mechanisms 152 are illustrated in the position they occupy at the beginning of a winding operation. The other ends of the wires $W_1$ and $W_2$ are connected to tie down clamps (not shown) or to a previously wound armature. To initiate the winding of the armature core 30 shown in FIGURE 3, the fliers 152 are initially at rest, such that the wires $W_1$ and $W_2$ extend closely adjacent a first-lead rotator 160 forming part of the first lead positioner 132. The first-lead rotator 160 is generally disc-shaped, but has oppositely projecting arm portions 162 and 164. The arm portion 164 extends downwardly to one side and the arm portion 162 extends outwardly on the other side. The arm portion 164 is formed as an outwardly extending ear or hook member adapted to engage the wire $W_1$, while the arm portion 162 has an outwardly extending hook member 166 adapted to engage the wire $W_2$. In this connection, see FIGURE 1. The member 160 is connected to a pulley drum 168, which, as shown in FIGURE 7, is mounted for rotation upon a bearing sleeve 170, which in turn encircles an inner sleeve 172 described in greater detail below. A cable 174 is wrapped around the pulley drum 168 and connected at one end to the end of a cylinder shaft 176, which is driven by a hydraulic or pneumatic actuator 178 mounted upon a horizontal plate portion 180 of the carriage 112. The other end of the cable 174 is attached to a fixture 182 and spring biased vertically downwardly, as shown in FIGURE 1, by a spring 184 connected to a pin 186 mounted on the lower end of an elongate bracket 188 depending vertically from the plate portion 180. The spring 184 normally biases the cable into the position shown in FIGURES 1 and 2, whereupon the first-lead rotator 160 is oriented as shown in FIGURES 3 and 5. Retraction of the cylinder shaft 176, however, overcomes the bias of the spring 184 causing the drum 168 and, accordingly, the first-lead rotator 160 to rotate in a counterclockwise direction as viewed in FIGURE 1. The opposed hook portions at 164 and 166 of the member 160 thereupon engage the wire strands $W_1$ and $W_2$, respectively, causing them to be deflected in a counterclockwise direction and drawn toward the armature core 30 and the commutator 20.

As may be observed in FIGURE 3, the inner shield 124 has a pair of diametrically opposed narrow slots or appertures 190 therein which expose diametrically opposed lead wire receiving slots in the commutator 20. The first rotator 160 rotates by an amount sufficient to locate the wires $W_1$ and $W_2$ into position over a pair of opposed wire deflecting arms 214 forming part of the second lead positioner or lead rotator 134. As will be described more fully below, the arms 214 serve to continue rotation or deflection of the wires $W_1$ and $W_2$ until they are located over the upper and lower slots 190 respectively. Since the wire strand $W_1$ is thereby raised out of its normal, horizontal position and the wire strand $W_2$ is lowered out of its position, the portion thereof overlying the apertures 190 will enter the exposed slots of the commutator 20. This path of the wire $W_1$ is schematically indicated by dotted line $W_3$ in FIGURE 3. (The flier 152 for the wire $W_1$ is illustrated in FIGURE 3 in a somewhat lower position than it occupies when the wire path $W_3$ is formed.) At this time, upper and lower tamper blades 192 which are connected by adapters 194 to the free ends of the tamper arms 142, move toward the exposed slots in the commutator striking the portions of the wire strands $W_1$ and $W_2$ therein to deform the wire, thus temporarily wedging them in the exposed slots.

Operation of the tamper assemblies 142, 192 is accomplished as follows. Referring to FIGURES 2 and 7, a floating, double-acting tamper operating cylinder 196 is connected to the rearward end of the lower tamper arm 142, that is, the end to the left as viewed in FIGURE 2, by an adapter 198. The cylinder 196 actuates a cylinder shaft 200 connected to the upper tamper arm 142 by an adapter 205. In FIGURES 2 and 7, the shaft 200 is shown extended. Accordingly, the rearward ends of the tamper arms 142 are separated and the tamper blades 192 are inserted in the slots 190 in the shield 124. Normally, the shaft 200 is retracted in the cylinder 196 whereupon the rearward ends of the arms 142 are drawn toward one another about the pivot pins 140, and the blades 192 are retracted from the slots 190. To insure proper operation of the tamper blades 142, a heavy compression spring 204 is coiled about the shaft 200 between the adapters 198 and 205. Also, an adjustable upper stop assembly 206 and an adjustable lower stop assembly 208 supported by the housing 126 provide fixed stops against which one of the tamper arms 142 will engage upon extension of the shaft 200. Consequently, the rearward end of the other tamper arm 142 must then be moved away from the tamper arm 142 which has come against a fixed stop. The stops 206 and 208 may be of any conventional design and are illustrated as the well-known type referred to as adjustable screw stops.

After the initial tamping operation, the cylinder 196 retracts the shaft 200 to return the tamper arms 142 to the position shown in FIGURE 3. At this time, the lead wires $W_1$ and $W_2$ are wedged into the opposed, exposed slots in the commutator 20. Since the operation of the two fliers and also the mechanisms for attaching the upper and lower lead wires to the commutator 20 are essentially identical, only one of these mechanisms will be described in detail below. The portion of the wire strands $W_1$ which has been wedged to one of the slots in the commutator 20 is designated $W_4$ in FIGURES 4, 5 and 6. The armature 30 is now indexed, such as by the indexing mechanism shown in Moore Patent No. 2,627,379, in a clockwise direction as viewed in FIGURE 3. The flier 152, which has been stationary during the interval in which the first leads have been tamped into the commutator slots, is now rotated in a counterclockwise direction to wind a coil, designated C in FIGURES 4 and 5, in spaced pairs of slots in the armature 30. Note that the portion of wire $W_1$ directed to lead $W_4$ passes through an armature slot adjacent the coil C and is anchored about an armature tooth, as illustrated at $W_5$. After the first coil has been wound from the wire strand $W_1$, the flier 152 is stopped in the position shown in FIGURE 4. Accordingly, there is a portion of the wire strand $W_1$ indicated by dotted lines $W_6$ in FIGURE 4 passing from a slot in the armature core 30 to the wire guide 154. Note that this portion of the wire strand $W_1$ passes closely adjacent the shield 124.

The lead rotating assembly 134 includes a pair of substantially identical jaws 210 and 212, which are generally symmetrically mounted about the shaft 122. The jaws 210, 212 are not illustrated in FIGURE 1. In FIGURE 7, the jaws 210, 212 are shown rotated into their position also shown in FIGURES 4 and 6. The jaw 210 is designed to operate upon the wire strand $W_1$ and includes the generally horizontal, forwardly projecting wire engaging and deflecting arm 214 extending adjacent to and in front of the outer end of the shield 124 immediately below the path of the wire portion $W_6$. As already mentioned, the function of the arm 214 is to engage the wire portion $W_6$ and deflect it upwardly over the exposed commutator slot, as shown in full line in FIGURE 4. The jaw 212 similarly acts upon the wire strand $W_2$. To this end, the jaws 210 and 212 are affixed to the inner sleeve 172 (FIGURE 7) which in turn is affixed to the spur gear 130. A generally vertical rack 216 (FIGURES 1, 2 and 3) supported by a rack adapter 218 upon a rack actuating shaft 220 meshes with the gear 130. The rack 216 may be held in engagement with the gear 130 by a slide plate 222 affixed to the housing 126. The shaft 220 is driven along a vertical path by a rack actuating hydraulic or pneumatic cylinder 224 mounted upon the bracket 188 and firmly secured thereto as by an adapter 226 and clamps 228. As apparent, upon movement of the shaft 220 upwardly, the rack 216 also moves upwardly to rotate the spur gear 130 and thus pivot the jaws 210 and 212 as already described, whereupon they occupy the position shown in FIGURE 4. The arms 214 have outer, horizontal wire deflecting surface portions 214a which actually engage the wire. Upper and lower stops 124a project radially outwardly from the surface of the shield 124 adjacent the apertures 190 to insure that the wire portions deflected by the surfaces 214 enter the slots 190.

Note that, as a result of the indexing operation described above causing the armature to be indexed by one slot width, a spaced exposed slot in the commutator 20 is aligned with the upper shield slot 190. As soon as the wire portion $W_6$ has entered the presently exposed slot in the commutator 20, due to the previously described rotation of the jaw 210, the tamper arm 142 is again actuated to wedge a portion of the wire strand $W_6$ therein. At this time, the loop-former arm 144, which carries a loop-forming hook member 230 at its forward or outer end moves downwardly such that the tip of the hook member 230 engages the surface of the commutator 20, which is exposed by an enlarged aperture 232 in the shield 124 communicating with the narrow slots or apertures 190. The jaw 210 is then rotated back from the position shown in FIGURE 4 to that shown in FIGURE 5 and the flier 152 rotated from the position shown in FIGURE 4 to that shown in FIGURE 5, whereupon a loop L is formed in the wire $W_1$ about the hook 230. The jaw 210 is again rotated in a counterclockwise direction, as shown in FIGURE 6, so as to lay the portion of the wire strand $W_1$ leading from the loop L to the flier 152 into the same exposed commutator slot in which a wire strand has just been tamped. The tamper arm 142 is again lowered, as shown in FIGURE 6, whereupon the lead for the coil previously wound is now completely, but temporarily, attached to the commutator 20. The hook 230 and tamper blades are then raised, the jaw 210 rotated back to its original position, shown in FIGURE 3, and the armature indexed in readiness for the winding of the next coil. Permanent attachment of the leads is accomplished at a later stage, and may be done in any suitable fashion. Since the specific method for permanently attaching the lead wires forms no part of this invention, such is not illustrated herein.

The mechanism for actuating the hooks 230 in the manner described above is shown in FIGURE 7 and includes a pair of pistons 234 slidably mounted on opposite sides of the shaft 122 in cylinders 236 bored in the housing member 126. The pistons 234 and the loop-former arms 144 are provided with opposed sockets 238 and 240, respectively, which receive connecting pins 242. As apparent, upon movement of the pistons 234 radially outwardly from the shaft 122, the loop-forming arms 144 will be pivoted about the pins 140 from the position shown in FIGURE 7 to that shown in FIGURE 5. The pistons may be actuated by compressed air, which is supplied in any conventional fashion to the cylinders 236. The arms 144 are returned to retract the hook members 230 by means of a heavy compression spring 244 connected to the rearward ends thereof, that is, the ends to the left, as viewed in FIGURE 7. The spring 244 passes through a vertical aperture 246 extending through the housing 126.

The sequence of operations described above, namely, the indexing of the armature and the commutator, the winding of a coil, the deflecting of a lead, the tamping of the wire, the forming of a loop and the subsequent tamping of the wire, is repeated until the armature 30 has been fully wound with coils and all of the lead wires attached to the commutator 20. Those skilled in the art will appreciate that there will be only a single last lead wire connection from the last wound coil, which will enter the same commutator slot as the anchor lead wire $W_4$. This last lead may be severed from the flier immediately, or may remain connected until the first lead is attached to the next commutator to be worked upon. With the apparatus described above, the portion of the wire leading from the commutator to the previously wound armature, which is shown in dotted lines in FIGURE 3, is severed from the first lead $W_4$ after the commutator 20 has been indexed two or three times. This occurs when the wire, which is trapped below the shield 124, becomes taut, and is severed by sharp cutting edges formed in surrounding relation to the aperture 232 and, at 210a, on the jaws 210 and 212. Of course, the specific design and circuitry for the armature and commutator may vary, but the basic steps outlined above may be used in winding a wide variety of armatures and commutators.

The armature and commutator structure illustrated in FIGURES 1 through 11 is of the type in which two coil sides are wound in each armature slot and, accordingly, there are two commutator bars 22 for each armature slot. With this design, the two sets of lead wires from each armature slot are placed in immediately adjoining commutator slots 34. In order to expose first one slot 34 and then an adjacent slot 34, means are provided to rotate the shield 124 to change the position of the upper and lower apertures 190 in turn to expose one pair of commutator slots and then an adjoining pair. Referring to FIGURES 1 and 2, this means includes an indexing cylinder 248 pivotally mounted on a bracket 250 supported by the plate portion 180. The cylinder 248 drives an indexing shaft 252 connected by a pivotal adapter 254 to the housing 126. The housing 126 is fixedly connected in any suitable fashion to the shaft 122. Accordingly, upon actuation of the cylinder 248, the housing 126, the shaft 122, and the various elements supported by the housing 126, including the arms 142 and 144, are rotated through a few degrees. Thus, a different pair of commutator slots will be exposed by the apertures 190 and the tamper blades 192 will be positioned to enter the newly exposed commutator slots. At the time, the lower portion, designated 256, of the rack actuating cylinder 224 is actuated to raise the cylinder 224 slightly above the base of the bracket 188, thereby to adjust the setting of the rack 216, and, therefore the jaws 210 and 212.

The apparatus described above may be used in winding the armature and attaching lead wires to the commutator structure shown in FIGURES 8 through 11. With little change, the apparatus may be used in practicing the method illustrated in FIGURE 13. The only significant change required would be in the design of the tamper blades and the lead hooks. Those skilled in the art will appreciate that very little change would be necessary to attach lead wires to the commutator of FIGURE 12. The indexing mechanism described immediately above could be used to loop the wire between the pair of slots 42 in each commutator bar 44. In this case, the loop forming hook 230 would be retracted from the commutator as the flier is reversing its position to permit the wire W to be hooked around the riser portion 46.

The timing devices used to control the sequence of operation of the various actuators described above have not been illustrated herein. Those skilled in the art will appreciate that various well-known timing devices could be used.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In apparatus for use in winding armatures and attaching lead wires to commutators, the combination comprising: a flier for laying coils in an armature core mounted on an armature shaft, lead wire engaging means adapted to engage a portion of coil lead wire between the armature core and the flier and deflect a portion of the coil lead wire into a commutator slot of a commutator mounted on the same armature shaft, and tamping means adapted to tamp the portion of wire in said slot to temporarily wedge said wire therein.

2. In apparatus for use in winding armatures and attaching lead wires to commutators, each armature core and commutator being mounted on a common shaft, the combination comprising: lead wire engaging means adapted to engage and deflect a portion of coil lead wire into a commutator slot, tamping means adapted to tamp said portion of wire in said slot to temporarily wedge said wire therein; and means looping the wire such that another portion thereof enters said slot, said tamping means also tamping said another portion in said slot.

3. The structure of claim 2 wherein said tamping means comprises a tamper blade adapted to enter said slot, a tamper arm supporting said blade, pivot means pivotally mounting said arm, and means pivoting said arm about said pivot means.

4. The structure of claim 2 wherein said means looping the wire comprises a hook, a flier for laying coils in the armature core, said flier remaining stationary as said lead wire engaging means deflects said portion of said wire, and means moving said hook int the path of the deflected wire, said flier moving relative to said hook to loop the wire therearound.

5. The structure of claim 4 wherein said tamping means comprises a tamper blade adapted to enter said slot, a tamper arm supporting said blade, pivot means pivotally mounting said arm, means pivoting said arm about said pivot means, said hook being supported by an arm which is pivotally mounted on said pivot means.

6. In apparatus for use in winding armatures and attaching lead wires to commutators, each armature core and commutator being mounted on a common shaft, the combination comprising: means supporting said common shaft, including a support shaft and shield means carried by said support shaft adapted to shield coil lead wire receiving slots in said commutator; rotating flier means adapted to form coils of wire in said armature; lead wire engaging means mounted for rotation on said support shaft adapted to engage and deflect a coil lead wire into a commutator slot when said flier is at rest; tamping means adapted to tamp said portion of wire in said slot to temporarily wedge said wire therein; and means mounting said tamping means on said support shaft.

7. The structure of claim 6 further including first lead positioning means mounted for rotation on said support shaft adapted to engage and deflect a portion of wire directed to said flier toward said commutator when said flier is at rest and before a coil has been wound.

8. The structure of claim 6 wherein hook means are mounted on said support shaft, said hook means being adapted to enter the path of the deflected wire whereby a loop of wire is formed therearound when the flier is rotated.

References Cited

UNITED STATES PATENTS

| | | | | |
|---|---|---|---|---|
| 2,056,534 | 10/1936 | Poole | | 29—33 |
| 2,284,373 | 5/1942 | Cullin | | 29—33 |
| 2,385,619 | 9/1945 | Fausset et al. | | 29—205 |
| 2,659,959 | 11/1953 | Currivan | | 29—34 X |

THOMAS H. EAGER, *Primary Examiner.*

U.S. Cl. X.R.

242—5